Hayashi et al.

[11] 4,236,796
[45] Dec. 2, 1980

[54] PHOTOGRAPHIC CAMERA PROVIDED WITH FLASH MEANS

[75] Inventors: Toshio Hayashi; Toshinori Imura, both of Sakai, Japan

[73] Assignee: Minolta Camera Kabushiki Kaisha, Osaka, Japan

[21] Appl. No.: 12,197

[22] Filed: Feb. 14, 1979

[30] Foreign Application Priority Data

Feb. 21, 1978 [JP] Japan .................. 53-19460

[51] Int. Cl.³ .................. G03B 7/16; G03B 9/08; G03B 9/40; G03B 15/05
[52] U.S. Cl. .................. 354/145; 354/33; 354/234; 354/246
[58] Field of Search .................. 354/126-128, 354/145, 149, 133, 53, 35, 234, 235, 246, 26, 27, 29, 30-34, 23, 38, 60, 23 D

[56] References Cited

U.S. PATENT DOCUMENTS

| 3,675,547 | 7/1972 | Uchimaya et al. | 354/33 X |
| 3,768,390 | 10/1973 | Kobori | 354/235 X |
| 3,917,395 | 11/1975 | Ogawa | 354/23 D |
| 3,946,414 | 3/1976 | Kitai | 354/246 X |
| 3,953,867 | 4/1976 | Kondo | 354/234 X |
| 3,997,815 | 12/1976 | Decker | 354/128 X |
| 4,047,194 | 9/1977 | Nakamura et al. | 354/33 X |
| 4,084,167 | 4/1978 | Iwata | 354/33 |

FOREIGN PATENT DOCUMENTS 49-23869 6/1974 Japan .

OTHER PUBLICATIONS

Japanese Laid Open Patent Application No. 49-5618, K. Shiozawa.

Primary Examiner—Donald A. Griffin
Attorney, Agent, or Firm—Wenderoth, Lind & Ponack

[57] ABSTRACT

A photographic camera provided with flash tube has a voltage detector for detecting the voltage level of a power supply; a control circuit controlled by the detector for preventing start of the photographing operation until the voltage source of the power supply recovers to a predetermined level during charging of a first capacitor for firing of the flash tube; and a second capacitor connected in parallel with the power supply and connected between a primary winding of an electric voltage boosting circuit and the power supply. By this arrangement, the start of the photographing operation is prevented until the voltage level of the power supply is fully recovered after firing of the flash tube and operation of the camera.

13 Claims, 6 Drawing Figures

PHOTOGRAPHIC CAMERA PROVIDED WITH FLASH MEANS

BACKGROUND OF THE INVENTION

This invention relates to a photographic camera provided with flash means, and more particularly, to a camera of the above-described type in which a predetermined voltage level for discharging an electronic flash is indirectly confirmed by checking whether the level of the power source voltage has recovered to a predetermined stable level or not, and, if not, initial actuation for taking photographic pictures with a camera of the above-described type cannot be brought about.

With respect to a circuit arrangement of the camera provided with flash means for taking photographic pictures with the help of flash light, it is mandatory prior to taking a photograph to check whether the charging of the main capacitor of the flash means has been completed or not because firing of the flash means when the main capacitor is insufficiently charged results in a photograph with insufficient illumination of the photographed object. To this end, there have conveniently been proposed various arrangements for warning of an insufficient charge on the main capacitor or prohibiting an initial actuation of the shutter release of the camera until the completion of the charging of the main capacitor.

A popular arrangement for the above described checking of the state of the charge on the main capacitor is one which checks the voltage across the main capacitor, which is to be raised to a high level by a voltage boosting circuit, or a voltage obtained by dividing the main capacitor voltage by way of a bleeder circuit, as is disclosed, for example, in Japanese Laid Open Patent Application Tokkaisho No. 49-5618(1974). However, this arrangement suffers from the drawback that circuit elements which can withstand a high voltage are required because the voltage to be detected is a high voltage as mentioned above.

An arrangement which can obviate this drawback is disclosed in Japanese Utility Model Publication No. 49-23869(1974), for example. This arrangement makes use of the fact that, in the course of the procedure for charging the main capacitor by way of an electric power source and a voltage boosting circuit of the oscillating type, the power source voltage is first abruptly lowered to quite a low level and then gradually returned to the stable rated level thereof. That is to say, a voltage checker means or a checker means which checks the power source voltage is provided in this arrangement for the checking on the state of the charge on the main capacitor.

However, the voltage recovery characteristic from the low level to the constant stable level described above is commonly accompanied by a certain amount of voltage fluctuation around the time-averaged instant value thereof, due to the effect of incorporation of the voltage boosting circuit in the power source circuit so as to boost the voltage, to obtain the high voltage level for charging the capacitor as described above. Therefore, a voltage checker means or a checking means for checking the level of the power source voltage, which is generally incorporated in the circuit arrangement for the camera of the above-described type, sometimes produces a signal indicating the full recovery of the voltage level of the power source voltage corresponding to the completion of electric charging of the capacitor, and thus indicating the possibility of starting actuation of the camera for taking photographic pictures with resultant faulty pictures, because the level of the power source has only apparently been brought up to the predetermined power rating by a positive instant fluctuational peak in the time-averaged power voltage which is recovering to the above-mentioned rating.

SUMMARY OF THE INVENTION

Accordingly, an essential object of the present invention is to provide a photographic camera with flash means wherein the completion of charging of the capacitor to a predetermined voltage level capable of firing a flash tube so as to cause it to emit a sufficient amount of light is precisely confirmed by checking whether the level of the power source voltage itself has correspondingly recovered to a predetermined stable rating or not, and if not, initial actuation for taking a photographic picture is prevented.

Another important object of the present invention is to provide a photographic camera with flash means of the above-described type wherein circuitry is provided to charge the capacitor mentioned above with the help of a voltage boosting circuit means without causing any momentary fluctuation with respect to a time-averaged power source voltage recovery to the above-mentioned rating during the charging procedure described above.

A further object of the present invention is to provide a photographic camera of the above-described type which further comprises an electromagnetic shutter release means which can be associated with the initial actuation described above and an automatic exposure control means.

A still further object of the present invention is to provide a photographic camera of the above described type, wherein the circuit arrangement described above is quite simply constructed, with a limited number of components for the purpose described in the foregoing.

Another important object of the present invention is to provide a photographic camera of the above described type with a flash means which can be readily incorporated into cameras of various types at low cost.

A further object of the present invention is to provide a photographic camera of the above-described type, which is highly efficient in its operation and which can be manufactured at low cost.

In accomplishing these and other objects according to one preferred embodiment of the present invention, there is provided a photographic camera provided with flash means in which a predetermined charging level for firing the flash means so as to cause it to emit a sufficient amount of light is indirectly confirmed by checking whether the level of the power supply means has recovered up to a predetermined rating level thereof or not. The camera provided with flash means as described above comprises; a voltage checker means connected to the power supply means so as to check the power source voltage impressed between terminals of the power supply means; a control means for preventing occurrence of an initial actuation for taking photographic pictures with the help of the voltage checker means until the level of the power supply means has recovered to a certain predetermined rating in the course of charging a first capacitor, which is for firing the flash means so as to cause it to emit a sufficient amount of light, to a certain predetermined level; a second capacitor connected in parallel with the power supply means for the flash means while being incorporated between a primary winding of an electric voltage boosting circuit means of an oscillating type and the power supply means; an electromagnetic shutter release means which is associated with the initial actuation mentioned above; and an automatic exposure control means.

More specifically, the power supply means for the electromagnetic shutter release circuit means is common with the power supply means for the flash means, and the voltage checker means described above is provided with a switching element which is for causing the electromagnetic shutter release circuit means to be electrically energized only when the level of the power supply means has recovered to the predetermined rating.

Furthermore, the second capacitor described above is connected with the power supply means through a change-over switching means to actuate the flash means.

The power supply means for the automatic exposure control means is also common with the power supply means described above, and is also electrically fed through the switching element described above only when the level of the power supply means has recovered to the predetermined rating.

By the circuit arrangement described in the foregoing, in the course of charging the first capacitor the momentary fluctuations around the time-averaged power source voltage increasing to the rating voltage of the power source voltage, which are brought about due to the effect caused by the incorporation of the voltage boosting circuit means including therein an oscillating circuit, are effectively relaxed so as to be diminished.

Therefore, even if the camera of the above-described type is so arranged that the initial actuation for taking a photographic picture is brought about by a predetermined power source voltage attained by completion of the charging of the first capacitor, there is no possibility at all that actuation for taking a photographic picture will be effected.

BRIEF DESCRIPTION OF THE DRAWINGS

These and other objects of the present invention will become apparent from the following description of a preferred embodiment thereof and the accompanying drawings in which.

Before the description of the present invention proceeds, it is to be noted that like parts are designated by like reference numerals throughout the accompanying drawings.

DETAILED DESCRIPTION OF THE INVENTION

Although not particularly described hereinbelow, a photographic camera to which the concept of the present invention is applied is to be understood as including, as its principal components, an object lens assembly, which may be constituted by one or more lens elements; a focal plane where a light sensitive film is located; a shutter cocking or charging mechanism for bringing a shutter mechanism to a cocked or charged position ready for actually taking photographic pictures, the shutter cocking and charging mechanism generally being associated with a manipulative film advancing lever so that, upon completion of movement of the film advancing lever to advance the light sensitive film from one frame to another past a definite position where exposure of the film takes place, the shutter mechanism can be set in the cocked or charged position; a viewfinder arrangement through which the camera is aimed at a target object to be photographed and a shutter release button, which when depressed, releases the shutter mechanism from the cocked or charged position to achieve the exposure of the film.

All of these principal components of the photographic camera as well as their operative relationships are known to those skilled in the art, and therefore, the details thereof are omitted for the sake of brevity. However, in accordance with the present invention, the photographic camera of the type referred to above further includes a flash means, wherein a predetermined voltage level sufficient for firing an electronic flash so as to cause it to emit a sufficient amount of light must be precisely confirmed by checking whether the level of the power source voltage is at a predetermined stable level or not, and if not, occurrence of an initial actuation for taking photographic pictures with the camera of the above-described type is prevented, all of which will now be described with reference to the accompanying drawings.

Figure 1:
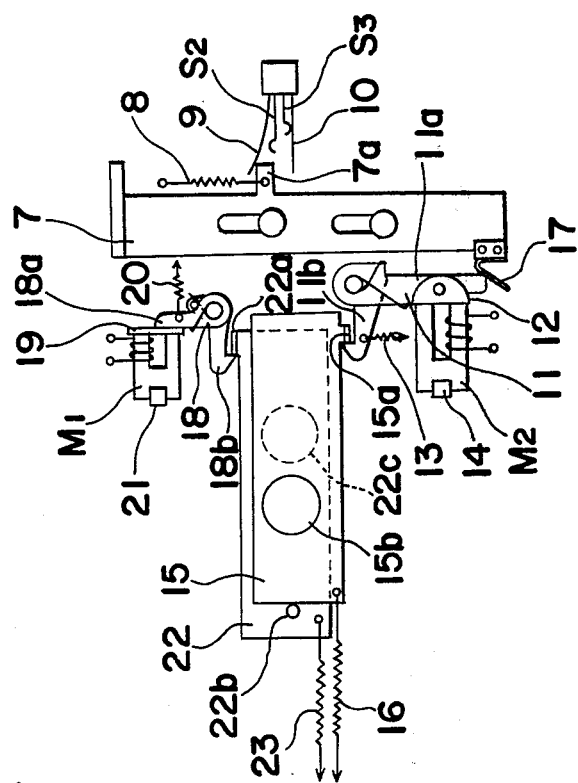
FIG. 1 is a partial front view particularly showing a mechanical arrangement of a shutter releasing mechanism of a camera provided with a flash means according to one preferred embodiment of the present invention, which mechanism is to be actuated in association with an electric circuit arrangement of the present invention following the depression of a shutter release member.
Figure 2:
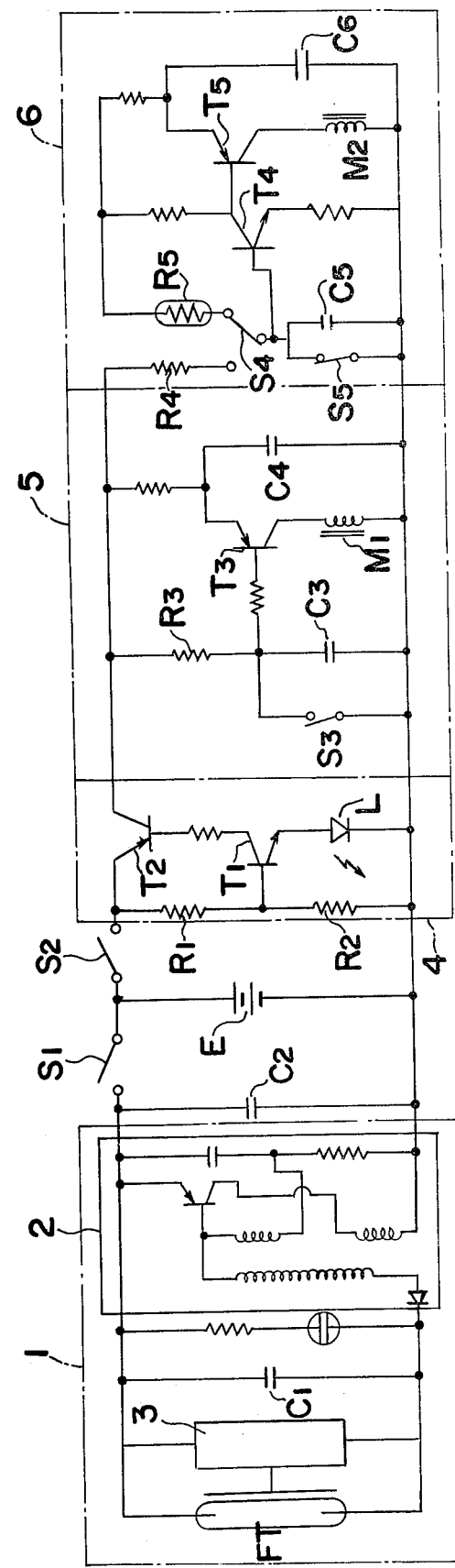
FIG. 2 is an electric circuit diagram of a circuit employed in the embodiment of FIG. 1, particularly showing circuit-connections of various electric and electronic components of respective circuit means incorporated therein.

Referring now to FIGS. 1 and 2, there is shown one embodiment of a camera having flash means 1 according to the present invention. More specifically, there is shown in FIG. 2 a circuit arrangement incorporated in the camera of the present invention, while FIG. 1 shows the construction of the actuating mechanism of shutter releasing mechanism.

The specific circuit arrangement for the flash means 1, further includes a voltage boosting circuit 2 of an oscillating type, a trigger circuit 3, a main capacitor $C_1$, and a discharge tube (FT), each of which is connected in parallel with respect to a DC power source denoted by E in FIG. 2. When the specific flash means 1 is connected in a manner as described in the foregoing and as specifically shown in FIG. 2, the main capacitor $C_1$ is impressed with the high power voltage through both terminals thereof, with the help of voltage boosting circuit 2, wherein the main capacitor $C_1$ is gradually charged in the manner as shown in FIG. 3 over a period of time, unless it has previously been fully charged.

Figure 3:
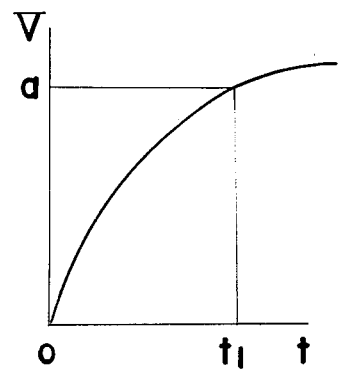
FIG. 3 is a graph showing the variation of voltage impressed on a main capacitor to make it ready for discharge of an electronic flash employed in the embodiment with respect to time.
Figure 4:
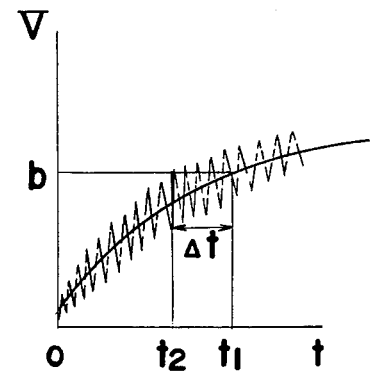
FIG. 4 is a graph showing the variational nature of the power source voltage during the course of charging of the capacitor with the help of a conventional boosting circuit arrangement with respect to time.

In accordance with the charging process shown in FIG. 3, the power source voltage of the DC power source E mentioned above is first abruptly lowered to quite a low level at $t=0$, as shown in FIG. 4, as soon as the charging of the main capacitor $C_1$ is started, and in the course of the charging process, the power source voltage gradually recovers to an initial rating value specified for the D.C. electric cell. However, there will be momentary fluctuations or small-scale oscillation around the increasing time-averaged instant voltage level.

The oscillation characteristics described above are due to the functional characteristics of the voltage boosting circuit 2 which is incorporated in the circuit arrangement described above, to boost the voltage impressed on the main capacitor $C_1$ as described above.

Therefore, if the camera provided with flash means is so arranged that the predetermined charge of the main capacitor $C_1$ is completed at a moment when the level of the terminal voltage impressed on the main capacitor $C_1$ reaches a certain level as denoted by a in FIG. 3, and thereby actuation of the camera for taking a photographic picture is brought about at the momentary level of the value of the power source voltage denoted by b in FIG. 4 at the moment mentioned above, the unstable, momentary oscillational or fluctuational peak around the time-averaged instant value of voltage which is recovering to the stable rating value may trigger the initial actuation of the camera. More specifically, the starting of the actuation of the camera will be brought about at a time $t_2$ which is $\Delta t$ prior to the time $t_1$ at which the rated voltage is reached, because the fluctuational or oscillating peak momentarily reaches voltage level b at the time denoted by $t_2$. However, the time-averaged instant voltage at the time $t_2$ is still far less than the predetermined level as specifically shown in FIG. 4.

According to the present invention, to prevent occurrence of the undesirable action described above, a further capacitor $C_2$ is incorporated in the circuit arrangement described above in parallel relationship with the flash means 1 with respect to the power source E, being disposed between the D.C. power source E and the voltage boosting circuit 2 of the flash means 1, and a change-over switch $S_1$ is provided between the D.C. power source and the capacitor $C_2$ mentioned above.

The switch $S_1$, which is arranged to be manually changed-over, is provided as a change-over switching means for taking photographic pictures with the help of the flash light caused by the flash means 1 of the present invention.

In the circuit arrangement described above, a voltage checker, or detecting means 4 is further included, being connected with the power source E through a main switch $S_2$. The voltage checker means 4 comprises a pair of voltage dividing resistors $R_1$ and $R_2$ connected in series across the power source E and constituting a divider of the voltage of the electric battery E, transistors $T_1$ and $T_2$, and further, a light emitting diode L, the collector and emitter of the transistor $T_2$ being connected in series with one side of the power source E, and the base thereof being connected to the other side of power source E in series with the light emitting diode and the collector and emitter of transistor $T_1$, the base of transistor $T_1$ being connected to the junction between resistors $R_1$ and $R_2$. In this circuit arrangement, the respective values of the resistors $R_1$ and $R_2$ are such that the transistor $T_1$ is turned on soon after the level of the voltage of the electric battery E recovers to the level of voltage indicated by b in FIG. 4, whereby respective transistors $T_1$ and $T_2$ are turned on in a sequential manner and thereby, the light emitting diode L is lit.

Furthermore, the circuit arrangement of the present invention further includes a circuit means for a shutter release 5 of the electromagnetic actuated type and an automatic exposure control circuit means 6, both being parallel-connected with each other, and both being connected in common with the electric battery E through the transistor $T_2$ and the main change-over switch $S_2$. As a result, according to the present invention, these three circuit means, i.e., the flash means 1, the shutter release circuit means 5 of the electromagnetic actuated type, and the automatic exposure control circuit means 6 have the common electric power source E.

The shutter release circuit means 5 comprises a delay magnetic actuating type mentioned above comprises a delay circuit which is constituted by a resistor $R_3$ together with respective capacitor $C_3$ and transistor $T_3$, and an electromagnet $M_1$, a capacitor $C_4$, and a change-over switch $S_3$. The capacitor $C_4$ is charged when the transistor $T_2$ is turned on. The change-over switch $S_3$ is arranged to be opened, upon completion of depression of a shutter release member which will be specifically described hereinbelow. The capacitor $C_3$ then starts to be charged in response to the opening of the change-over switch 3, and thereafter, the transistor $T_3$ is turned on after a predetermined time, whereby the capacitor $C_4$ is discharged through the transistor $T_3$ and the electromagnet $M_1$, so that, the electromagnet $M_1$ is energized.

The automatic exposure control circuit means 6 comprises a delay circuit constituted by a fixed resistor $R_4$, a photoconductive element $R_5$ for measuring the brightness of an object to be photographed, a capacitor $C_5$, and a switching circuit constituted by a change-over switch $S_4$ and respective transistors $T_4$ and $T_5$, and further, an electromagnet $M_2$, a capacitor $C_6$, and a change-over switch $S_5$. The capacitor $C_6$ is charged soon after the transistor $T_2$ is turned on. The change-over switch $S_4$ is adapted to be selectively connected to the photoconductive element $R_5$ use in for taking photographic pictures under a natural light condition, and to the fixed resistor $R_4$ use in for taking photographic pictures with the help of the flash light, and further, the change-over switch $S_4$ may be arranged to be changed-over in association with the changeover of the switch $S_1$ described earlier. The switch $S_5$ is opened in association with the actuation of a shutter opening member described hereinafter so that the capacitor $C_5$ is, in turn, charged. After a predetermined time-period set by the delay circuit, selectively constituted by either the fixed resistor $R_4$ or the specific resistance of photoconductive element $R_5$, from the moment of the charging of the capacitor $C_5$, both transistors $T_4$ and $T_5$ are turned on in succession, whereby the capacitor $C_6$ is discharged through the transistor $T_5$ and the electromagnet $M_2$, and thereby, the electromagnet $M_2$ is energized.

Referring back to FIG. 1, as described earlier, there is shown one embodiment of the shutter releasing mechanism of the present invention, in which a shutter release actuating member 7 is secured to a camera body (not shown) in a manner such that it is capable of being downwardly depressed by manual depression and being upwardly urged by a coil spring 8 connected to a laterally projecting portion 7a of the shutter release actuating member 7.

At the right side of the shutter release actuating member 7 of FIG. 1, there is shown a pair of resiliently movable actuators 9 and 10 forming part of the switch $S_2$ and the switch $S_3$, respectively, which are disposed above and below the laterally projecting portion 7a in a manner such that they are resiliently moved for actuating the respective switches $S_2$ and $S_3$ from a contact state to a non-contact state by the vertical movement of the shutter release actuating member 7.

More specifically, during the vertical movement of the member 7 from the position specifically shown in FIG. 1, in which the member 7 is fully raised, the actuator 9, which is resiliently bent, is first released and thus moves into contact with the other contact of switch $S_2$ and thereafter the actuator 10 is to be separated from the other contact of the switch $S_3$ so that the switch $S_3$ is turned OFF.

On the left side of the shutter release actuating member 7 of FIG. 1, there is shown an arresting member 11 having double levers for arresting a shutter closing member 15. The arresting member 11 comprises a vertical lever 11a having a portion 12 made of electromagnetically attractive material and disposed opposite a yoke portion of an electromagnet $M_2$, and a lateral lever 11b having a latch-shaped portion at one end portion thereof and urged counterclockwise by a spring 13 with respect to a common pivot for the two members 11a and 11b so as to urge the vertical member 11a away from the yoke, each of the members 11a and 11b being engaged with the other. However, the spring force acting on the lateral member 11b is arranged to be smaller than the attractive force generated by a permanent magnet 14 incorporated in a portion of the yoke of the electromagnet $M_2$, when the portion 12 is attracted to the magnetic poles of the yoke. As long as the portion 12 is engaged with the yoke due to the attractive force thereof, the latch shape portion in the arresting member 11 remains in engagement with a lateral edge portion 15a provided on the shutter closing member 15, so that the shutter closing member 15 is maintained in a charged state against the spring force of a spring 16 connected with the shutter closing member 15 at the left end of the shutter closing member 15. The shutter release actuating member 7 is further provided with a leaf spring 17, which is secured to the bottom left edge of the member 7 in a manner such that, in response to completion of return of the member 7 to its fully raised position as shown in FIG. 1, the leaf spring 17 contacts the bottom end of the vertical lever 11a and thereby moves the member 11 to a resetting state thereof against the resilient force of the spring 13 with the portion 12 being simultaneously brought into contact with the yoke of the electromagnet $M_2$.

In the shutter opening mechanism, there is provided another arresting member 18 of the double lever type for arresting a shutter opening member 22. The arresting member 18 comprises a vertical lever 18a, which has thereon a leaf-portion 19 made of electromagnetically attractive material the same as the portion 12 and further is urged in a direction away from the yoke of an electromagnet $M_1$, i.e., in a clockwise direction in FIG. 1, by a spring 20, and a lateral member 18b having a latch-shaped portion at one end portion thereof. Furthermore, as described in connection with the member 11, the spring force of the spring 20 is also arranged to be smaller than the attractive force generated by a permanent magnet 21 incorporated in a portion of the yoke constituting the electromagnet $M_1$. The arresting member 18 is arranged to engage a lateral edge portion 22a provided on the shutter opening member 22 by the latch portion thereof so that the shutter opening member 22 is maintained in a charged state against the resilient force of a spring 23, when the leaf-portion 19 is attracted into contact with the pair of magnet-poles of the electromagnet $M_1$. The arresting member 18 is reset to the engaged position thereof in association with the film advancing operation. Similarly, the shutter opening member 22 is also charged in association with the film advancing operation, while the shutter closing member 15 is simultaneously brought into the charged state by a pin 22b provided on the shutter opening member 22.

In this embodiment of the present invention, the trigger circuit 3 is set in the operational mode thereof soon after the shutter closing member 15 starts moving to the left in FIG. 1. However, the shutter opening, constituted by an opening 22c provided in the shutter opening member 22 and an opening 15b provided in the shutter closing member 15, is still kept in its fully opened state at the moment when the trigger circuit 3 is switched into the operational mode thereof. Furthermore, by the time at which the initial condition for the shutter release arrives as described in the foregoing, the power source voltage has naturally recovered to the predetermined level as denoted by b in FIG. 4 according to the present invention, so that it is high enough to make the electromagnetic shutter release circuit means 5 together with the automatic exposure control circuit means 6 function properly, since these three circuit means, namely the electromagnetic shutter release circuit means 5, and the automatic exposure control circuit means 6, and the flash means 1, are all arranged to have the same electric battery E as a common power source as described earlier.

Specific functional characteristics of the present embodiment shown in FIGS. 1 and 2 will become apparent from the following description.

When taking photographic pictures under a natural light condition without the help of flash light, the switch $S_1$ is first opened, and thereby, the change-over switch $S_4$, which may be arranged to be associated with the actuation of the switch $S_1$ as described earlier, is changed-over to the photoconductive element $R_5$. By such an initial operational procedure according to the present embodiment, if the voltage level of the electric battery E is higher than that denoted by b, the switch $S_2$ is closed at the initial stage of depression of the shutter release actuating member 7 and then the respective transistors $T_1$ and with $T_2$ are both turned on, whereby the light emitting diode L is lit and as the respective capacitors $C_4$ and $C_6$ are charged. An the initial stage of depression of the member 7, the leaf-spring 17 is vertically shifted downwardly, to free the vertical lever member 11a from the upward urging force thereof, but the portion 12 is still being attracted by the yoke of electromagnet $M_2$, due to the magnetic force caused by the permanent magnet 14 incorporated in the yoke.

In the course of further depression of the shutter release actuating member 7, the laterally projecting portion 7a opens the switch $S_3$ against the resilient force of the actuator 10 and thereby, as described earlier, the capacitor $C_3$ starts to be charged in response to the opening of the switch 3, the transistor $T_3$ being turned on after a predetermined time, whereby the capacitor $C_4$ is discharged and the electromagnet $M_1$ is energized. Due to the energization of the electromagnet $M_1$, the magnetic force generated by the permanent magnet 21 is offset, thus releasing the leaf-portion 19, and the arresting member 18 disengages from the lateral edge portion 22a by a clockwise pivotal movement of the arresting member 18, which is brought about by the spring 20. Immediately after the completion of the series of the above-described action the shutter opening member 22 is transferred by the spring force of the spring 23 to a specific point, in which the opening 22c is brought into alignment with the opening 15b, and thereby, the exposure period starts.

In response to the start of the transferring movement of the shutter opening member 22, the switch $S_5$, which is arranged so as to be actuated to open at the start of the transferring movement, is opened, and thereby, the capacitor $C_5$ is started to be charged. However, the rate of charging of the capacitor $C_5$ is according to the value of the resistor $R_5$ constituting the photoconductive element or more specifically, the brightness of the object to be photographed. After a certain time interval specifically designed for correct exposure is over, respective transistors $T_4$ and $T_5$ connected in series are turned on, and the capacitor $C_6$ is discharged and the electromagnet $M_2$ is energized. Consequently, due to the energization of the electromagnet $M_2$, the magnetic force generated by the permanent magnet 14 is offset, and the portion 12 is released, and the arresting member 15 disengaged from the lateral edge portion 15a by a counterclockwise pivotal movement of the arresting member 15, which is brought about by the spring 13. Upon completion of this series of actions, the shutter closing member 15 is transferred leftward to move the opening 15b out of alignment with opening 22c by the resilient force of the spring 16, and whereby the predetermined exposure period is brought to an end.

However, in obtaining the correct exposure, if the power source voltage of the electric battery E has been reduced to a level much lower than that denoted by b in FIG. 4, the transistor $T_1$ and $T_2$ will be maintained in their OFF-state, respectively and thus the electromagnetic shutter release circuit means 5 as well as the automatic exposure control circuit means 6 are not supplied with power, even if the switch $S_2$ is closed by the depression of the shutter release actuating member 7. In the situation described above, since the functions of these circuits are not carried out, the camera of the present invention is not allowed to take photographic pictures, and thus the camera of the invention prevents taking faulty photographic pictures when the voltage supply has fallen to a certain extent.

When taking photographic pictures with the help of flash light, the change-over switch $S_4$ is changed-over to the fixed resistor $R_4$, in association with the manual closure of the switch $S_1$. Upon completion of closure of the switch $S_1$, the electric voltage boosting circuit 2 including an oscillating circuit therein is placed in an operational mode so that the main capacitor $C_1$ is charged. However, in accordance with one of the further advantages of the camera of the present invention, even if the closure of the switch $S_2$ is brought about by undepressing the shutter release actuating member 7 during the period of charging of the main capacitor $C_1$, the respective transistors $T_1$ and $T_2$ are both maintained in their OFF-state and thus the initial actions to operate the camera of the present invention will not be brought about, since the predetermined voltage level of the electric battery E needed to operate the camera properly wil not be reached until the voltage between the terminals of the main capacitor $C_1$ reaches the level denoted by a in FIG. 3. Furthermore, by the incorporation of the capacitor $C_2$ in the circuit arrangement of the present invention having the functional characteristics described earlier, the change of the transistors $T_1$ and $T_2$ to the ON-state cannot occur due to the occurrence of a fluctuational peak voltage corresponding to the predetermined rating voltage value of the battery E during the time of impressing the voltage between the terminals of the main capacitor $C_1$, since the common voltage fluctuation around the time-averaged instant voltage value during recovery to the predetermined voltage level of the electric battery is sufficiently relaxed and resultantly diminished. By the arrangement as described above, the possibility of taking faulty photographic pictures with insufficient exposure due to the actuation of the shutter release mechanisms and simultaneous firing of the flash tube FT when the charge on the main capacitor $C_1$ is still incomplete, is eliminated.

However, according to the present invention, as long as the shutter release actuating member 7 is kept depressed, the procedure for charging the main capacitor $C_1$ is continuously carried out and thus the respective transistors $T_1$ and $T_2$ are made conductive immediately after the terminal voltage impressed on the main capacitor $C_1$ reaches the level denoted by a, whereby the electric power supply for the electromagnetic shutter release circuit means 5 together and the automatic exposure control circuit means 6 is started and thus the shutter release with correct exposure is also accomplished. It is, however, to be noted here that the exposure period for taking photographic pictures with the circuit arrangement as described above is predetermined, since the change-over switch $S_4$ is kept unchanged in the mode in which it has been changed-over to the fixed resistor $R_4$. Furthermore, at the start of the leftward transferring movement of the shutter closing member 15, the trigger circuit means 3 is actuated so as to cause the flash tube FT to be filed.

The above-described arrangement for associating the firing of the flash tube FT with the transferring movement of the shutter closing member 15 is necessary for the reason described hereinbelow.

According to the conventional method, the firing of the flash tube FT is associated with the transferring movement of the shutter opening member 22. However, the conventional arrangement should not be incorporated in the present embodiment. This is due to the fact that, according to the present invention, in connection with the restart of another run for charging the main capacitor $C_1$, which takes place immediately after the discharging of the main capacitor $C_1$, and the resulting sudden drop in the power source voltage, the transistors $T_1$ and $T_2$ are turned off for a certain time as described earlier, and thus, the electric power supply from the common battery E to the automatic exposure control circuit means 6 is interrupted. Therefore, as described earlier, since the arresting member 11 is retained in the arresting position by the magnetic force generated by the permanent magnet 14 of the electromagnet $M_2$ unless the electromagnet $M_2$ is energized, the interruption of the electric power supply to the means 6 inevitably leads to the undesirable situation, in which the shutter closing member 15 is kept in the closed state by the arresting member, and therefore, the shutter release is not accomplished at all. Consequently, the conventional arrangement described above can not be employed in the present invention, and therefore in the arrangement of the present invention, the firing of the flash tube FT must take place in association with the transferring movement of the shutter closing member 15.

Furthermore, when a dark target object having a background sufficiently bright to be photographed without the help of flash light, is to be photographed with the help of flash light, i.e., in the case of taking photographic pictures under a daylight synchronized flashing condition, the change-over switch $S_4$ may be changed-over to the photoconductive element $R_5$. More specifically, even if the exposure period is not long enough for the target object to be photographed due to the fact that the change-over switch $S_4$ is being changed-over to the photoconductive element $R_5$ and thereby the over-all correct exposure must depend upon the brightness of the background, the flash light emitted by the firing of the flash tube FT will compensate for the lack of brightness for taking photographic pictures of the target object together with the background, so that the exposure as a whole will be at the correct exposure conditions.

In the following, a modified embodiment of the present invention is described with reference to FIGS. 5 and 6, in which it is, however, to be noted that like parts are designated by reference numerals used for designating the like parts of FIGS. 1 and 2.

According to this modified embodiment, as long as the main capacitor $C_1$ of the flash means 1 is not fully charged, shutter release, or more specifically, depression of the shutter release actuating member 7 is arranged to be prevented, before the occurrence of disengagement between the arresting member 18 and the shutter opening member 22 is brought about.

Figure 6:
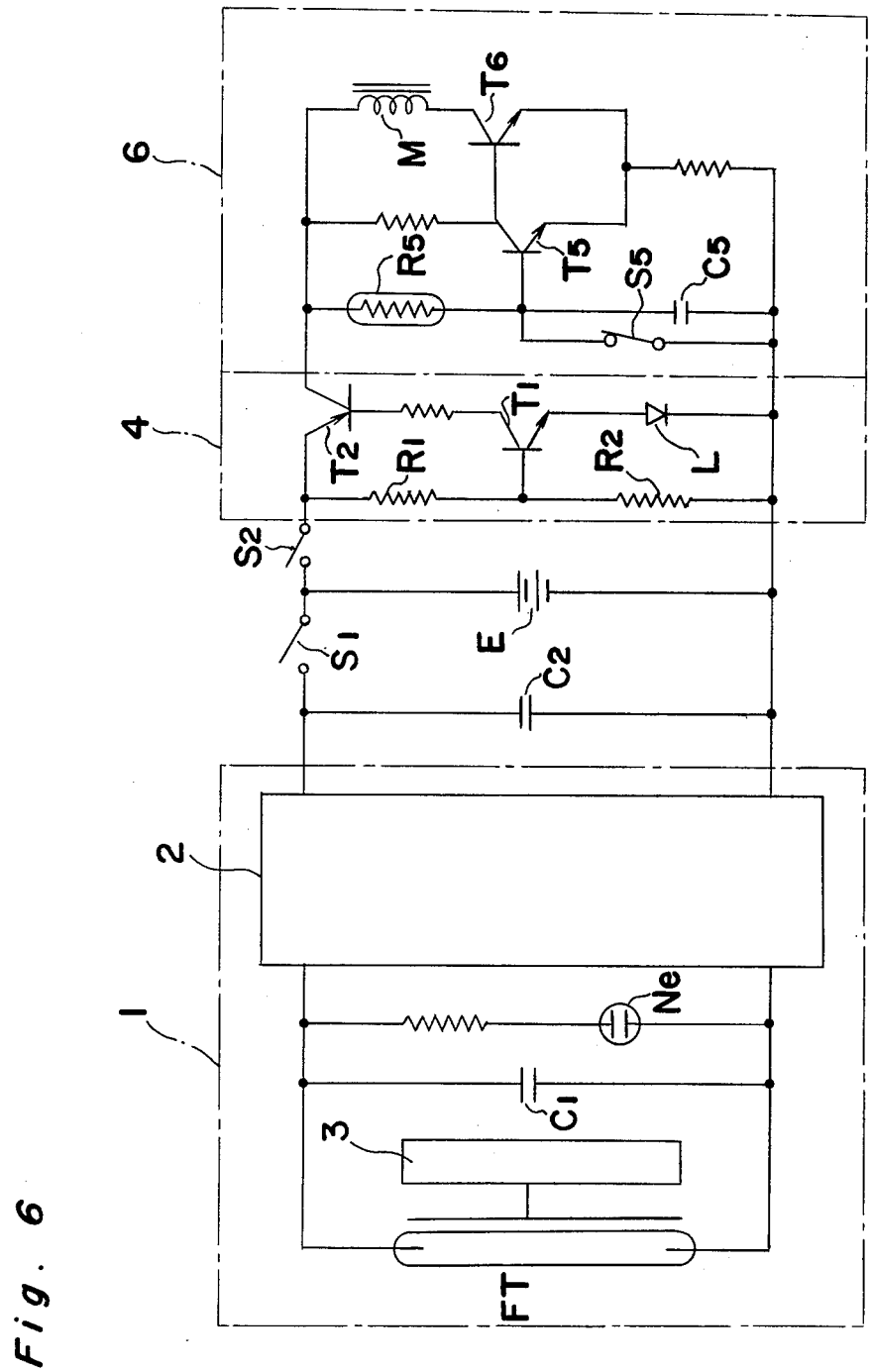
FIG. 6 is a circuit diagram similar to FIG. 2, particularly showing the circuit employed in the embodiment of FIG. 5.

Therefore, as specifically shown in FIG. 6, there is no electromagnetic shutter release circuit means provided according to this modified embodiment, and instead the voltage checker means 4 and the automatic exposure control means 6 are directly juxtaposed, i.e. the former circuit means is directly connected with the latter circuit means. Furthermore, the automatic exposure control means 6 does not include the change-over switch $S_4$, and therefore, only the photoconductive element $R_5$ is connected in series with the capacitor $C_4$. An electromagnet M is here arranged to be energized through by the electric current which is conducted through the transistor $T_2$ and therefore, the capacitor $C_6$ which is employed in the first embodiment is eliminated in this modified embodiment.

Figure 5:
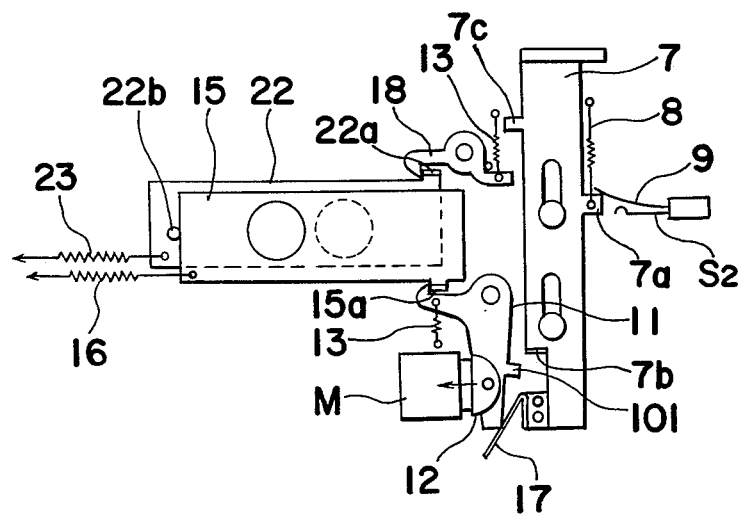
FIG. 5 is a view similar to FIG. 1, particularly showing a mechanical arrangement of a shutter releasing mechanism of a camera provided with a flash means according to another preferred embodiment of the present invention.

Furthermore, as is shown in FIG. 5, the electromagnet M of this embodiment does not counteract the effect of a permanent magnet as in FIG. 1, and therefore, retains the portion 12 on the arresting member 11 by the attractive force thereof as long as the electromagnet M is being energized. By the arrangement as described above, until the shutter release operation is carried out to such an extent as to close the switch $S_2$, or more specifically, as long as the switch $S_2$ is in the open position due to the fact that the shutter release actuating member 7 is left in its fully raised position, the electromagnet M is not electrically energized and thus the arresting member 11 is retained in its arresting state only by the upward urging force of the leaf spring 17. As described earlier, a portion 101 projecting laterally from the right side of the arresting member 11, is provided for preventing the downward movement of the shutter release actuating member 7 toward its fully lowered position, the portion 101 being engagable with the lateral edge portion 7b on the shutter release actuating member 7, when the arresting member 11 is pivotally moved counterclockwise by the spring force of the spring 13 during the vertically downward movement of the shutter release actuating member.

A projecting portion 7c is provided on the shutter release actuating member 7 for engagement with arresting member 18 releasing the engagement between the latch portion of the arresting member 18 and the lateral edge portion 22a of the shutter opening member 22, the end portion of the arresting member 18 being pushed downward against the spring force of the spring 13 in the course of the final part of the downward stroke of the member 7 to produce a clockwise pivotal movement of the arresting member 18. According to the arrangement described in the foregoing, when the downward stroke of the shutter release actuating member 7 is stopped during its vertical travel by the portion 101 the projecting portion 7c does not contact the end portion of the arresting member 18.

According to this modified embodiment, the trigger circuit means 3 is arranged to be actuated upon the completion of the leftward movement of the shutter opening member 22. The pin 22b on the surface of the shutter opening member 2 is provided not only for holding the shutter closing member 15 in the, but also for retaining the shutter closing member 15 in the charged state even if the shutter closing member 15 is released by arresting member 11 before the release of the shutter opening member 22.

Even when taking photographic pictures with a camera equipped with the flash means of this modified embodiment under daylight conditions without the help of flash light, the switch $S_1$ is opened first. The switch $S_2$ is closed in due course during the downward movement of the shutter release actuating member 7, and, as a result, the respective transistors $T_1$ and $T_2$ are first caused to become conductive and thereby, the automatic exposure control circuit means 6 is electrically energized, and the light emitting diode L is lit, provided that the electric voltage level of the electric battery E has fully recovered to a level higher than that designated by b in FIG. 4 at that moment. Accordingly, the transistor $T_6$ is changed to the ON-state, and thereafter, the electromagnet M is energized. Energization of the electromagnet M magnetically attracts the portion 12, whereby the arresting member 11 is retained in engagement with the shutter closing member 15, even after the leaf spring 17 separates from the member 11 during the depression of the member 7. Upon completion of the downward stroke of the member 7, the end of the arresting member 18 is pushed downward as described above and the arresting member 18 is pivotally moved to disengage it from the shutter opening to release the engagement with the shutter opening member 22, whereby the shutter opening member 22 is leftwardly transferred by the spring force of the spring 23 and thus, the exposure period is started. In response to the transfer of the shutter opening member 22, the switch $S_5$ is opened, and thus, the capacitor $C_5$ is charged through the photoconductive element $R_5$. As soon as the voltage level at the junction between the capacitor $C_5$ and the photoconductive element $R_5$ rises to a predetermined voltage level, the transistor $T_5$ is changed to the ON-state and the transistor $T_6$ is changed to the OFF-state. Consequently, the electromagnet M ceases generating the magnetic force, since the energization of the electromagnet M is end, whereby the arresting member 11 is released and is pivotally moved counterclockwise by the spring force of spring 13. The engagement between the edge portion 15a and the latch portion of the member 11 is thus disengaged, and the shutter closing member 15 is leftwardly transferred by the spring force of the spring 16, to complete the correct exposure.

However, if the electric power of the electric battery E is not sufficiently high with reference to the predetermined voltage level denoted by b due to the consumption of the electric power of the battery E, the closure of switch $S_1$ does not cause either of the respective transistors $T_1$ and $T_2$ to become conductive, and this no electric power is supplied to the automatic exposure control circuit means, whereby the electromagnet M is maintained in a de-magnetized state. Therefore, as soon as the leaf spring 17 moves away from the end of the member 11 during the vertical downward movement of the member 7, the arresting member 11 is pivoted counterclockwise by the spring force of the spring 13 so that projecting portion 101 is engaged by the edge portion 7b of the member 7 to prevent the further downward movement of the shutter release actuating member 7. When the downward movement of member 7 is blocked, the shutter opening member 22 is not released, because the projecting portion 7c on the member 7 has not contacted the arresting member 18, and therefore the arresting member 18 still retains the shutter opening member 22 in the charged condition so that the shutter release is not started, whereby the taking of photographic pictures with an incorrect exposure condition due to the lack of sufficient electric voltage of the battery is prevented from occurring.

As is clear from FIG. 5, the shutter closing member 15 is prevented from carrying out the leftward transferring movement by means of the pin 22b provided on the surface of the shutter opening member 22. Therefore, when the member 7 returns to the extreme raised position in response to the release of depressing action on the member 7, the arresting member 11 is pivoted clockwise against the spring force of the spring 13, so as to engage with and retain the shutter closing member in the closed condition thereof.

When taking photographic pictures with the help of flash light, the switch $S_1$ is first closed. Thereafter, if the electric voltage of the battery E has recovered to the level denoted by b in FIG. 4 and the charge on the main capacitor $C_1$ is completed at the moment at which the closure of the switch $S_2$ takes place midway of downward stroke of the shutter release actuating member 7, the respective transistors $T_1$ and $T_2$ are first changed to the ON-state, thus being about the series of actions similar to those for taking photographic pictures under the daylight conditions. Therefore, upon completion of the leftward transferring movement of the shutter opening member 22 to align the opening 22c with the opening 15b for exposure, the flash tube FT is fired by the trigger circuit means 3. As is clear from the above description, in response to the firing of the flash tube FT, since the discharge of the main capacitor $C_1$ together with the sudden drop of the voltage level of the electric battery E both take place in succession, the respective transistors $T_1$ and $T_2$ are charged to the OFF-state and thereby the electromagnet is de-magnetized. Accordingle, since the shutter closing member 15 is leftwardly transferred immediately after the discharge of the main capacitor $C_1$ through the flash tube FT, the correct exposure is completed.

On the contrary, if the voltage level of the electric battery has not recovered to the level denoted by b in FIG. 4 due to the fact that the charging of the main capacitor $C_1$ is not completed at the moment at which the closure of the switch $S_2$ takes place, the respective transistors $T_1$ and $T_2$ are not made conductive. Therefore, following the downward movement of the shutter release actuating member 7, the arresting member 11 is pivoted counterclockwise by the spring force of the spring 13 and the projecting portion 101 is engaged by the edge portion 7b of the member 7, whereby the further downward movement of the member 7 is prevented, and therefore, the release of the shutter opening member 22 does not take place. Accordingly, when photographic pictures are to be taken with the help of flash light by a camera equipped with the modified embodiment of the present invention, the undesirable result of the taking of photographic pictures with insufficient exposure due to the lack of sufficient flash light from the flash tube FT, or more specifically, the insufficient charging of the main capacitor $C_1$, can be entirely eliminated. Furthermore, even with the circuit arrangement of the present modified embodiment, the momentary fluctuations or small scale oscillation around the increasing time-averaged instant voltage level during the charging of the main capacitor $C_1$ due to the effect of incorporation of the voltage boosting circuit means including the oscillating circuit therein in the circuit arrangement, are also arranged to be relaxed or to be diminished by providing the capacitor $C_2$. Therefore, there is no possibility even in this case that the respective transistors $T_1$ and $T_2$ will be made conductive so as to bring about premature taking of photographic pictures before fully charging the main capacitor $C_1$.

In the case where the actuator of the camera for taking photographic pictures is not accomplished due to the incomplete charging of the main capacitor $C_1$ the main capacitor $C_1$ as described in the foregoing, the shutter release actuating member 7 after it has been released from the depressed state, can be again depressed upon the completion of the charging of the main capacitor $C_1$.

Although the present invention has been fully described by way of example with reference to the accompanying drawings, it is to be noted that various changes and modifications will be apparent to those skilled in the art. For example, although the flash means of the present invention is incorporated in an internal camera control circuit in the above-described embodiments, the flash means of the present invention may be a type capable of being separately provided and which can be readily releasably mounted onto the camera body when needed. Furthermore, although in the above described embodiments of the present invention, the power sources both for the electromagnetic actuated type shutter release circuit means and the automatic exposure control circuit means are common with that of the flash means, the arrangement does not require the camera to include the flash means of the present invention. More specifically, the power source for the flash means may be provided only for the flash means itself, separate from the common power source for both the shutter release circuit means and the automatic exposure control circuit means, even if the flash means of the present invention is incorporated in the camera. In such a case, immediately after the charging of the main capacitor up to the predetermined level and the recovery of the electric power source voltage to the predetermined level are both accomplished, the voltage checker means is caused to output a signal for triggering the respective actuations of the shutter releasing circuit means and the automatic exposure control circuit means. Moreover, according to the circuit arrangements of the present invention, although the series of actions for carrying out the shutter release are not effected before such are arranged not to be effected before respective completion and recovery, the of the occurrence of the series of actions is not limited to that of shutter release as described above.

For example, in a camera in which the shutter release is arranged to take place immediately after the accomplishment of an aperture control step or a mirror-up step as in a single-lens reflex camera, the series of actions to be prevented before the completion of the two procedures described in the foregoing might alternatively be either the automatic aperture control step or the automatic mirror-up step. Furthermore, in an automatic focus control camera, since the automatic focus adjusting operation must be accomplished before the initiation of the shutter release operation, the occurrence of the automatic focus adjusting operation may be arranged to be prevented. Furthermore, with respect to synchronization of the moment of completion of the charge of the main capacitor and that of the recovery of the electric battery to the rating level, the moment at which the completion of the recovery occurs need not necessarily coincide with that of the completion of the charging of the main capacitor to the level denoted by a. This is because the actions of the mechanisms inside cameras generally cause a delay before the cameras are fully ready for taking photographic pictures. Therefore, the level of the charge on the main capacitor may be slightly lower than that denoted by a immediately before the moment the first actuation of the camera for taking photographic pictures takes place.

As is clear from foregoing description, in the camera provided with the flash means in which the shutter release or the other actuation for taking photographic pictures is prevented before the full recovery of the rating of the electric power source following the completion of the step for charging the main capacitor so that it is ready for the firing of the flash tube, the present invention is characterized in that a specific capacitor is connected with the primary winding of the oscillating circuit means included in the voltage boosting circuit of the flash means and thus specific capacitor and flash means are connected in parallel with the electric battery in the camera control circuitry.

By the circuit arrangement described in the foregoing, in the course of charging the main capacitor, the momentary fluctuations around the time-averaged power source voltage increasing to the rating voltage of the battery which is brought about due to the effect of the incorporation of the voltage boosting circuit means including therein an oscillating circuit, is effectively relaxed and diminished. Therefore, there is no possibility of premature actuation for taking photographic pictures, and therefore, of taking faulty photographic pictures due to insufficient exposure even under flash light conditions.

Furthermore, as is clear from the foregoing description, if the voltage checker means is incorporated in the camera control circuitry and has an electric power source common with the automatic exposure control circuit means, the shutter releasing circuit means of the above-described type, and the flash means respectively, the faulty actuation of camera operation, for example, actuation of shutter release before the recovery of the electric power of the electric power battery to the rated level, can be prevented even when taking photographic pictures under daylight conditions. In connection with this situation, if the voltage checker means is further provided with a switching element which, immediately after the electric voltage recovers to the predetermined rating, it is caused to be conductive so as to function as a power supply switch either for the automatic exposure control circuit means or for the shutter releasing circuit means, there is no need at all for additionally providing power feeding switches such as a relay which are actuated by a trigger signal from the voltage checker means. Thus, the circuit arrangememt for the camera provided with the flash means of the present invention is capable of not only being assembled in quite a simple manner, but also the circuit arrangement can be constructed as quite a simple integrated circuit.

In addition to the changes and modifications described in the foregoing, unless otherwise any further changes and modifications depart from the scope of the present invention, they should be construed as being included therein.

What is claimed is:
1. A photographic camera comprising:
a power supply means;
a flash means which includes a flash tube, a first capacitor connected to said flash tube for firing said flash tube upon discharge thereof, an oscillation type voltage boosting circuit having input terminals connected to said power supply means for receiving power therefrom and output terminals connected to said first capacitor to impress a high voltage on said first capacitor by the oscillating operation thereof for charging said first capacitor to said high voltage, and a trigger circuit connected to said first capacitor and said flash tube for initiating firing of said flash tube, the voltage level of said power supply means suddenly dropping upon commencement of the charging of said first capacitor and gradually recovering to an initial rating level during the course of charging of said first capacitor with accompanying fluctuations caused by the oscillating operation of said voltage boosting circuit;
a second capacitor connected to said power supply means in parallel with said first capacitor and said voltage boosting circuit and between said power supply means and said input terminals of said voltage boosting circuit for suppressing the fluctuations in the voltage level of said power supply means during recovery to the initial rating level;
a voltage detecting means connected to said power supply means for detecting the voltage level of said power supply means; and
a control means connected to said voltage detecting means and to said camera for preventing occurrence of an initial actuation of the camera for taking a photographic picture until the voltage level of said power supply means detected by said voltage detecting means has recovered to a predetermined level, said predetermined level being a level at which the voltage to which said first capacitor has been charged is sufficient for firing said flash tube so that it emits a sufficient amount of light for the desired photographic picture.

2. A photographic camera as claimed in claim 1, wherein said control means comprises an electromagnetic shutter release circuit means, said electromagnetic shutter release circuit means being actuated through said voltage detecting means only when said level of said power supply means has recovered to said predetermined level.

3. A photographic camera as claimed in claim 2, wherein said electromagnetic shutter release circuit is connected to said power supply means through said voltage detecting means, said voltage detecting means including a switching element which is actuable for allowing power to be supplied to said electromagnetic shutter release circuit from said power supply means only after said voltage level of said power supply means has recovered to said predetermined level, said predetermined level also being such that normal actuation of said electromagnetic shutter release circuit is ensured.

4. A photographic camera as claimed in claim 3, further comprising an exposure control circuit means which is connected to said power supply means through said switching element, said switching element further allowing power to said exposure control circuit means only after said voltage level of said power supply means has recovered to said predetermined level, said predetermined level further being such that normal operation of said exposure control circuit is ensured.

5. A photographic camera as claimed in claim 1, further comprising:
   a shutter;
   a shutter release actuating member connected to said shutter and movable in response to a shutter release operation and releasing said shutter when moved in an actuating direction through a predetermined first stroke; and
   an arresting member normally biased toward an operative position where it arrests said shutter release actuating member at a position where said shutter release actuating member has been moved in an actuating direction through a second predetermined stroke which is shorter than said first predetermined stroke, said predetermined voltage level of said power supply means further being such that normal operation of said exposure control circuit is ensured when said voltage level of said power supply means has recovered to said predetermined level, and wherein said control means includes an electromagnetic means connected to said voltage detecting means and magnetically associated with said arresting member for holding said arresting member in its inoperative position where said arresting member is incapable of arresting said shutter release actuating member only after said voltage level of said power supply means has recovered to said predetermined level.

6. A photographic camera as claimed in claim 5, further comprising a spring connected to said shutter release actuating member for moving said shutter release actuating member in a return direction and a returning means provided on said shutter release actuating member for engaging said arresting member and returning it to an inoperative position at the end of the return movement of said shutter release actuating member when said arresting member has been moved to the operative position.

7. A photographic camera as claimed in claim 6, wherein said electromagnetic means is connected to said power supply means through said voltage detecting means, said voltage detecting means including a switching element which is actuated for allowing power to be supplied to said electromagnetic means from said power supply means only after said voltage level of said power supply means has recovered to said predetermined level, whereby said electromagnetic means is actuated for holding said arresting member simultaneously with the supply of power thereto, said predetermined level also being such that normal actuation of said electromagnetic means is ensured.

8. A photographic camera as claimed in claim 5, wherein said shutter includes;
   leading and trailing shutter members biased from a cocked position to a rest position, respectively;
   a first locking means for releasably locking said leading shutter members in its cocked position, said first locking means being positioned for being engaged and moved by said shutter release actuating member to release the locking of said leading shutter member when said shutter release actuating member has been moved through said first stroke;
   a retaining means provided on one of said leading and trailing shutter members for retaining said trailing shutter member at its cocked position only when said leading shutter member is locked by said first locking means; and
   a second locking means for releasably locking said trailing shutter member in its cocked position, said second locking means being on said arresting member locking said trailing shutter member when said arresting member is in said operative position, and wherein said control means further includes an exposure control circuit for interrupting the actuation of said electromagnetic means after the passage of an exposure time.

9. A photographic camera as claimed in claim 1, wherein said voltage detecting means includes a display means actuated only after said voltage level of said power supply means has recovered to said predetermined level.

10. A photographic camera as claimed in claim 1, further comprising a manually operable power switch connected between said voltage boosting circuit and said power supply means.

11. A flash means for cameras, comprising a power supply means; a flash tube; a first capacitor connected to said flash tube for firing said flash tube upon discharge of said first capacitor; an oscillating type electronic boosting circuit having input terminals connected to said power supply means for being electrically suppled therefrom and output terminals connected to said first capacitor to impress thereon a high voltage through oscillating operation thereof such that said first capacitor is charged to a voltage level ready for firing said flash tube for causing it to emit a sufficient amount of light for taking the desired photographic picture; a second capacitor connected to said power supply means in parallel with said first capacitor and said electronic voltage boosting circuit and connected between said power supply means and said input terminals of said electronic voltage boosting circuit; and a voltage detecting means for detecting whether the voltage level of said power supply means has recovered to a predetermined level during the course of the charging of said first capacitor, said predetermined level being such that said first capacitor has been charged to the voltage level ready for firing said flash tube for causing it to emit a sufficient amount of light for taking the desired photographic picture.

12. A flash means as claimed in claim 11, wherein said power supply means is a common power supply means for at least one actuating means of a camera for actuating the camera for taking photographic pictures and is connected to said actuating means through said voltage detecting means.

13. A flash means as claimed in claim 12, wherein said voltage detecting means includes a switching element actuable for causing said at least one actuating means to be electrically supplied from said power supply means only after the voltage level of said power supply means has recovered to a predetermined level which is also high enough to ensure normal functioning of said at least one actuating means.

* * * * *